J. A. HORNE.
RESILIENT TIRE.
APPLICATION FILED OCT. 11, 1918.
1,308,633.
Patented July 1, 1919.
2 SHEETS—SHEET 1.
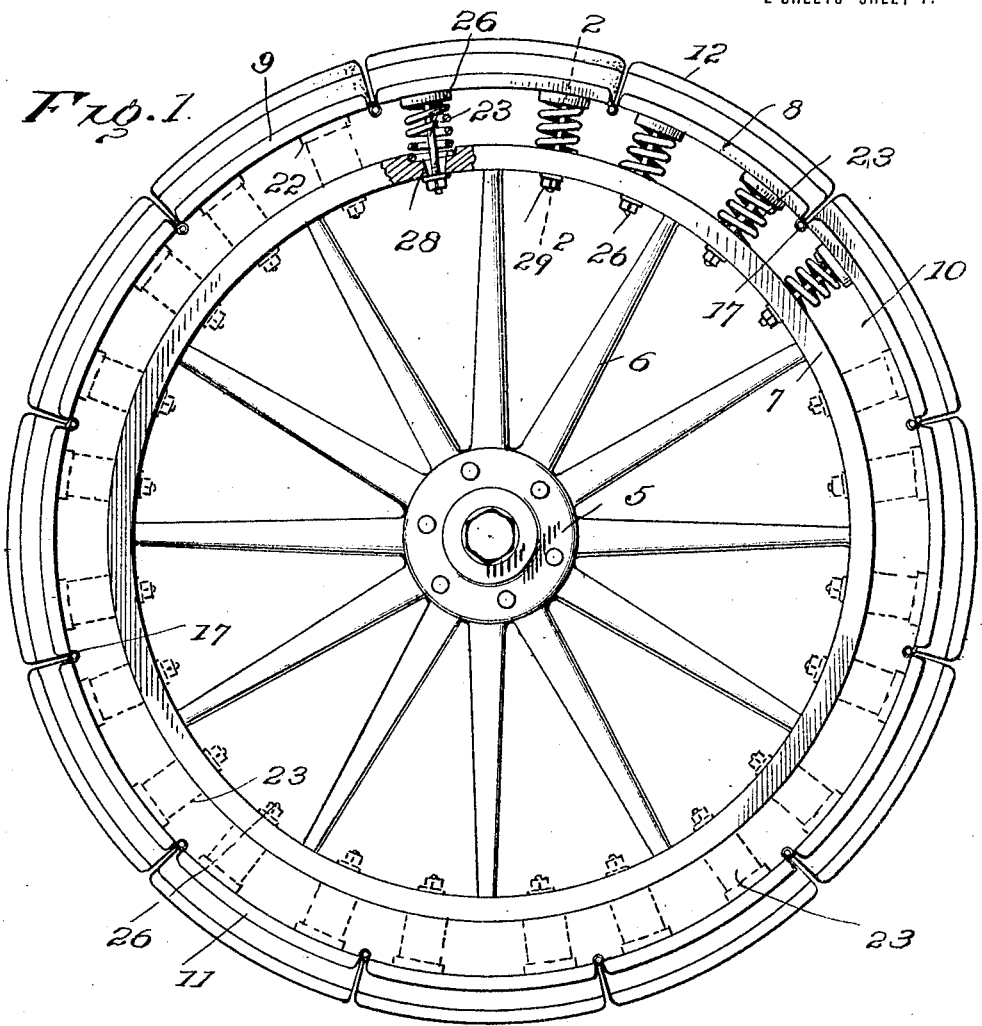
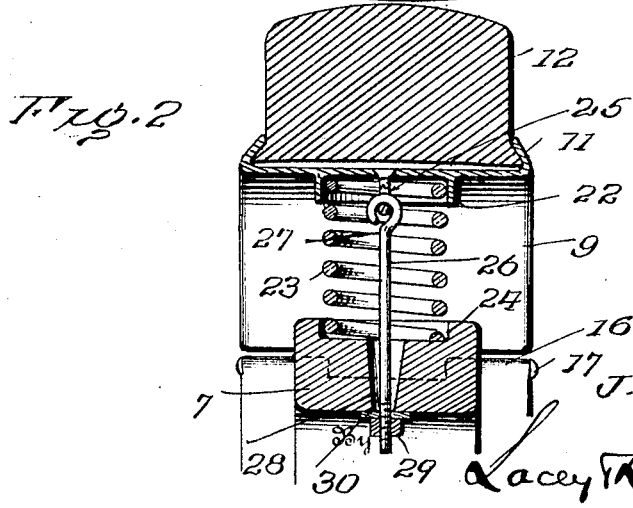
Inventor
J. A. Horne
By Lacey & Lacey, Attorneys

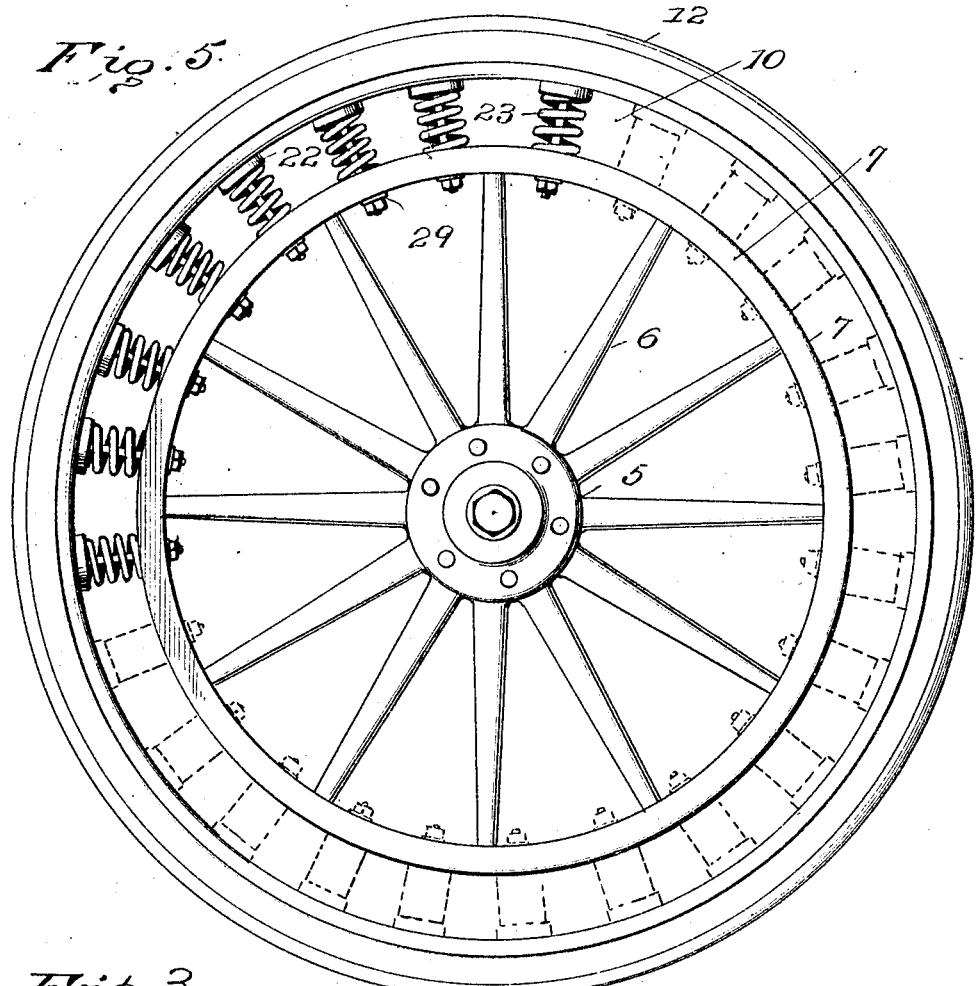
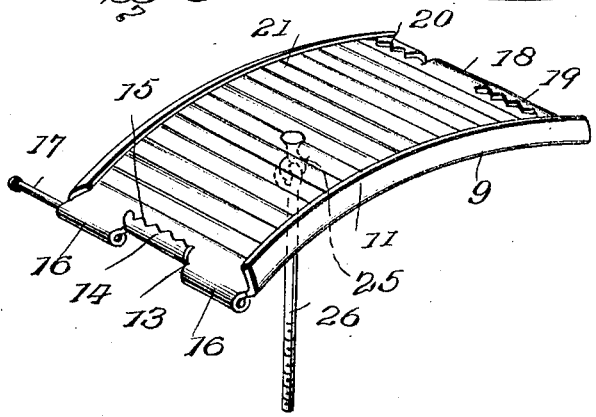

UNITED STATES PATENT OFFICE.

JAMES A. HORNE, OF WASHINGTON, DISTRICT OF COLUMBIA.

RESILIENT TIRE.

1,308,633.

Specification of Letters Patent.

Patented July 1, 1919.

Application filed October 11, 1918. Serial No. 257,719.

*To all whom it may concern:*

Be it known that I, JAMES A. HORNE, a citizen of the United States, residing at 508 12th St. N. W., Washington, D. C., have invented certain new and useful Improvements in Resilient Tires, of which the following is a specification.

This invention relates to resilient tires for automobile and other vehicle wheels and has for its object to provide a comparatively simple and thoroughly efficient device of this character especially designed to take the place of the ordinary pneumatic tire and which will present a yieldable tread surface to the ground and insure comfort in riding without liability of puncture and the resultant delay and annoyance incident to repairing the puncture.

A further object is to provide a resilient tire including a rim having a plurality of coiled springs secured thereto and which serve to yieldably support said rim in spaced relation to the felly of a wheel.

The invention further contemplates the provision of a yieldably supported rim formed of a plurality of pivotally united sections each carrying a tire segment, the rim sections and tire segments being provided with interengaging parts and the ends of the rim sections being formed with anchoring spurs adapted to engage the adjacent ends of the tire segments to prevent creeping thereof.

A still further object of this invention is generally to improve this class of devices so as to increase their utility, durability and efficiency.

Other and incidental objects will appear during the course of the detailed description of the invention. In the drawings, wherein I have illustrated the preferred embodiment of the invention, and wherein similar reference characters designate corresponding parts throughout the several views:

Figure 1 is a side elevation partly in section, of a resilient tire embodying the present invention, Fig. 2 is a transverse sectional view taken on the line 2—2 of Fig. 1, Fig. 3 is a perspective view of one of the rim sections shown in Fig. 1, detached, Fig. 4 is a detail longitudinal sectional view showing the manner of retaining the tire segments in position on the rim sections, and Fig. 5 is a side elevation illustrating a modified form of the invention.

The resilient tire forming the subject matter of the present invention may be applied to automobile or other vehicle wheels and by way of illustration is shown in connection with a wheel of ordinary construction in which 5 designates the hub, 6 the spokes, and 7 the felly.

The device comprises a yieldably supported circumferential rim 8 preferably formed of a plurality of pivotally united sections 9 spaced from the felly 7 to form an intermediate chamber 10.

Each rim section 9 is preferably stamped or otherwise formed from a single piece of metal, the opposite longitudinal edges of which are bent laterally and inwardly to form retaining flanges 11 for engagement with a tire segment indicated at 12. The metal at one end of each rim section is provided with spaced incisions 13 and the material between said incisions bent upwardly and inwardly to form a stop lug 14, the free end of which is serrated to produce anchoring spurs 15 adapted to be embedded in the adjacent tire segment 12 to assist in preventing accidental displacement thereof. The metal on opposite sides of the lug 14 is bent or rolled partially beneath the rim section to produce spaced eyes 16 adapted to receive a pivot pin 17. The metal at the opposite end of each rim section is bent or rolled to form an eye 18 adapted to fit between the eyes 16 of an adjacent rim section so as to permit the passage of one of the pivot pins or bolts 17, thus forming a hinge connection between the rim sections and permitting said sections to yield under the weight of a load without damage thereto. The metal at the opposite sides of each eye 18 is bent upwardly and inwardly to form stop lugs 19 having terminal anchoring teeth 20, said lugs 19 being disposed in staggered relation with respect to the lugs 14 and adapted to be embedded in the adjacent tire segment, as best shown in Fig. 4 of the drawings. The outer surface of each rim section is preferably corrugated transversely as indicated at 21, while each tire segment is correspondingly corrugated, the corrugations interengaging so as to prevent longitudinal creeping of the tire segments. If desired, however, the corrugations on the rim sections and tire may be dispensed with and in certain cases the anchoring lugs 14 and 19 may be omitted, without departing from the spirit of the invention. Formed on the inner or concave face of each rim section 9 are centering flanges 22 preferably two in number and within which are seated the adjacent ends of suitable coiled springs 23, the opposite ends of the coiled springs being fitted in suitable seats or depressions 24 formed in the outer face of the felly 7, as best shown in Fig. 2 of the drawings. Disposed within the centering flanges 22 and secured in any suitable manner to the adjacent rim sections 9 are loops or eyes 25 and pivotally connected with said eyes are securing bolts 26 the outer ends of which are bent to form hooks 27 fitting through the eyes 25 while the inner ends of the bolts extend through openings 28 in the felly of the wheel and are provided with threads for engagement with clamping nuts 29, there being suitable washers 30 interposed between the nuts 29 and the inner face of the felly in order to prevent undue wear on the latter. The bolts 26 serve to hold the rim in juxtaposition with respect to the felly and as said bolts extend through the springs 23 serve to prevent accidental displacement of the latter. The openings 28 are preferably conical in shape with the wide ends of the openings disposed at the outer face or surface of the felly 7, said openings serving to permit slight lateral movement of the bolts with respect to the felly when traveling over rough or uneven roads. Any desired number of coiled springs 23 may be provided but it is preferred to employ two of said springs between each pair of spokes. The rim sections are preferably wider than the felly and form in effect a guard or housing for said felly as well as for the coiled springs and their associated parts. It is preferred to use a solid tire of the type shown in cross section in Fig. 2 of the drawings but it will, of course, be understood that the segments constituting the tread surface of the wheel may be of any desired cross sectional formation and the treads of said sections made smooth or provided with an anti-skid surface as may be found desirable or preferable in actual practice.

In Fig. 5 of the drawings there is illustrated a modified form of the invention in which the rim of the wheel instead of being formed of a plurality of pivotally united sections, is in the form of a continuous circumferential rim, the construction of the resilient tire in other respects being similar to that shown in Fig. 1 of the drawings. It will, of course, be understood that when the rim of the tire is made continuous, one of the retaining flanges 11 will be detachable so as to facilitate the application and removal of the tire, which as shown in Fig. 5 of the drawings, is also preferably continuous. It will also be understood that the resilient tires may be made in different sizes to accommodate different sizes or types of wheels and that as many pivotally united rim sections and coiled springs may be employed as are found necessary to properly sustain the weight of the wheel to which they are applied.

Having thus described the invention, what is claimed as new is:

1. The combination with a wheel including a felly having spaced conical shaped openings formed therein with their large ends opening through the outer face of the felly and provided with seating recesses surrounding said openings, of a rim spaced from the felly and provided with centering flanges, eyes secured to the rim and centered within the flanges, bolts pivotally connected with the eyes and extending through the adjacent conical openings in the felly, coiled springs surrounding the bolts and having their opposite ends seated within the flanges and recesses in the felly respectively, a tire carried by the rim, and nuts engaging the bolts and bearing against the inner face of the felly.

2. The combination with a wheel including a felly, of a rim spaced from the felly and formed of a plurality of pivotally united sections, the longitudinal edges of each section being provided with inwardly extending retaining flanges, one end of each section being provided with an inwardly extending overhanging anchoring lug and the other end thereof with spaced anchoring lugs, the lugs at one end of each section being disposed in staggered relation to the lug at the opposite end of the section, and tire segments fitting between the flanges of the rim sections and bearing against the anchoring lugs.

3. The combination with a wheel including a felly, of a rim spaced from the felly and formed of a plurality of pivotally united sections, one end of each rim section being provided with spaced eyes and the other end of the section being formed with a single eye adapted to fit between the spaced eyes of an adjacent section, pivot bolts extending through said eyes, a tire segment carried by each rim section, and inwardly extending anchoring lugs formed on the opposite ends of each rim section and provided with terminal teeth adapted to be embedded in the ends of the adjacent tire segment.

4. The combination with a wheel including a felly, of a rim spaced from the felly and formed of a plurality of pivotally united sections, the outer face of each rim section being provided with inwardly extending retaining flanges and transverse corrugations, tire segments fitting between the flanges and bearing against the corrugations on the rim sections, and anchoring lugs projecting inwardly from the opposite ends of said sections for engagement with the tire segments.

5. The combination with a wheel including a felly, of a rim spaced from the felly and formed of a plurality of pivotally united rim sections, each rim section being provided with longitudinally disposed inwardly extending retaining flanges on the outer face thereof, one end of each rim section being bent to form an anchoring lug and spaced eyes disposed one on each side of said lug and the other end of each rim section being bent to form a central eye and inwardly extending anchoring lugs on opposite sides of said eye, the central eye of one rim section being adapted to fit between the eyes of an adjacent section, pins extending through all of said eyes and forming a pivotal connection between the sections, tire segments fitting between the flanges of the rim sections and engaging the anchoring lugs, and yieldable means interposed between the rim sections and the felly of the wheel.

In testimony whereof I affix my signature.

JAMES A. HORNE. [L. S.]

Copies of this patent may be obtained for five cents each, by addressing the "Commissioner of Patents, Washington, D. C."